(No Model.)
J. McC. PORTER.
HARNESS.
No. 297,003.                     Patented Apr. 15, 1884.
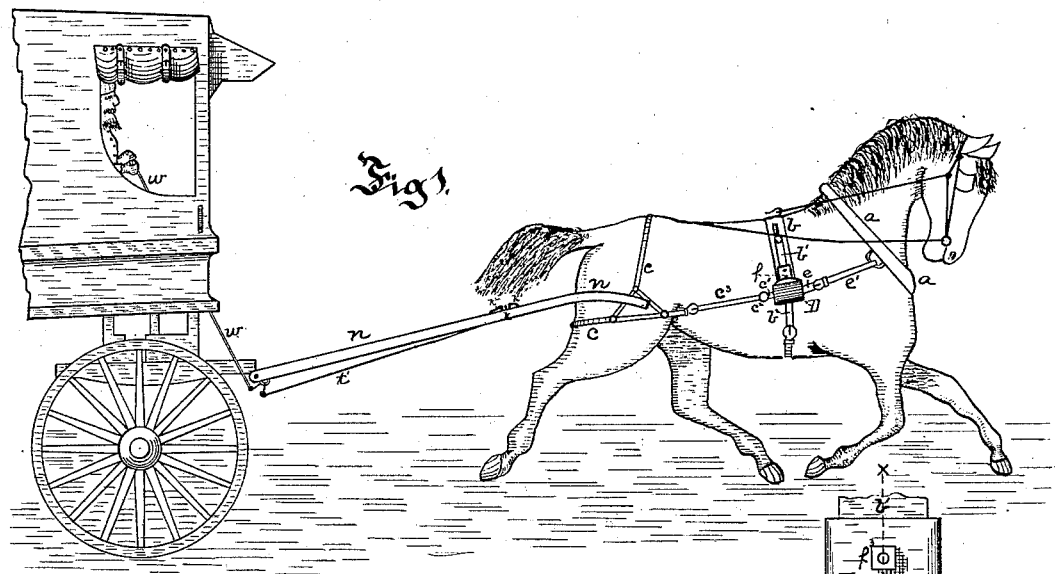
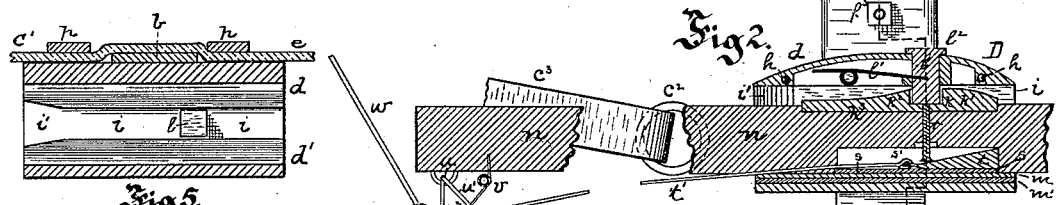
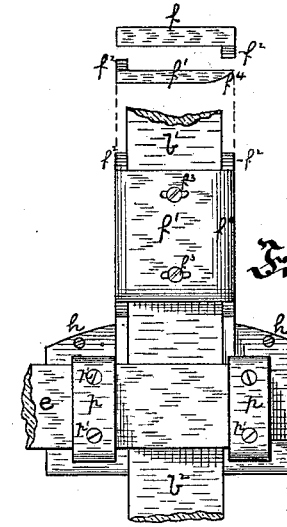
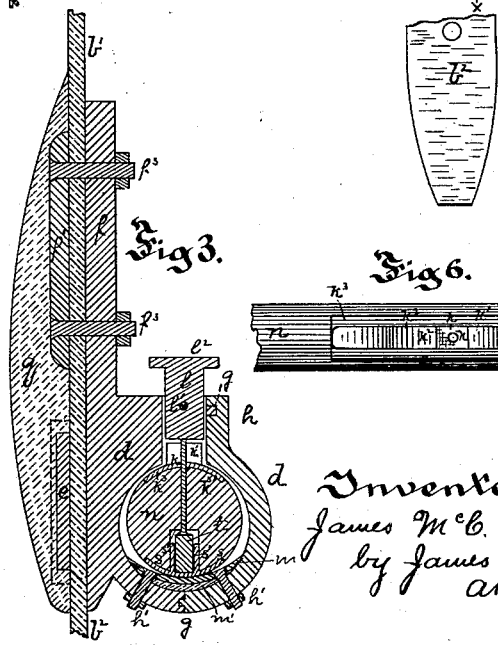
Witnesses.
J. G. Kay
J. W. Cooke
Inventor.
James McC. Porter
by James J. Kay
Attorney

UNITED STATES PATENT OFFICE.

JAMES McC. PORTER, OF COLLIER, ALLEGHENY COUNTY, PENNSYLVANIA.

HARNESS.

SPECIFICATION forming part of Letters Patent No. 297,003, dated April 15, 1884.

Application filed January 18, 1884. (No model.)

*To all whom it may concern:*

Be it known that I, JAMES McC. PORTER, of Collier township, in the county of Allegheny and State of Pennsylvania, have invented a new and useful Improvement in Harness and Hitching Gear; and I do hereby declare the following to be a full, clear, and exact description thereof.

My invention relates to the harnessing and hitching of horses, its object being to provide rapid means for hitching horses in shafts and unhitching them or freeing them therefrom. The ordinary harness now employed, after being secured on the horse, requires the passing of the shafts through the tugs, the fastening of the traces to the single-tree, the holdback-straps in the shaft-stays, and the belly-band, reins, &c., in their proper places, these operations being all necessary after the horse is backed between the shafts. By my invention the horse is so harnessed that it is only necessary to back him into the shafts, when the harnessing apparatus will engage automatically with the shafts and the horse is hitched therein. This I accomplish by providing suitable sleeves supported by the saddle in the same position as the shaft-lugs, and connected both with the traces and the holding-back strap, so that the strain in pulling or backing is carried to said sleeves, said sleeves or the shafts, or both, being provided with spring key and seat apparatus, which cause the engaging of the sleeves and shafts, and thus secure the horse to the vehicle. I have also provided detaching or unhitching apparatus operated from the vehicle-seat, by means of which the sleeves may be freed from their connection with the shafts, and the horse be thus instantly freed from the vehicle, and all danger of accident on account of the horse running off be done away with.

To enable others skilled in the art to make and use my invention, I will describe the same fully, referring to the accompanying drawings, in which—

Figure 1 is a side view of a horse and part of a wagon illustrating my invention. Fig. 2 is a longitudinal central section of one sleeve and part of the shaft. Fig. 3 is a cross-section on the line $x\ x$, Fig. 2. Fig. 4 is a back view of the sleeve, showing the arrangements of the straps. Fig. 5 is a horizontal section of the sleeve, looking from below; and Fig. 6 is a top view of part of the shaft.

Like letters of reference indicate like parts in each.

The harness of the horse requires but little change from that usually employed, and, as illustrated in the drawings, the harness has the usual collar and hames, $a$, instead of which the breast-strap may be employed; also the saddle $b$ and breeching $c$.

Instead of the ordinary shaft-tugs secured by the point-straps $b'$ to the saddle, the sleeves D are employed, each sleeve having the extension $f$, by which it is secured to the point-strap, or a separate strap having a buckle to engage with said point-strap. The sleeves are also provided with the billet $b^2$, of suitable length to buckle with the belly-band, the trace-strap $e$, which either connects by a buckle with a short trace, $e'$, extending back from the hame, or is made of sufficient length to connect directly with the hame, and the stay-strap $c'$, which is provided with a ring, $c^2$, through which the holding-back strap $c^3$ passes. It will thus be seen that as the traces are connected with these sleeves D, and the holding-back straps $c^3$ are also connected therewith, in either pulling or backing, the strain is transmitted through these straps directly to the sleeves D. These sleeves are preferably made of malleable iron, to impart the necessary rigidity, and are generally formed in two parts, $d\ d'$, the parts fitting together at top and bottom with lap or tongue-and-groove joints $g$, and being united by bolts or screws $h\ h'$. The inner portion or bore of the sleeve is cylindrical, corresponding approximately in size to the shaft at the point at which it is connected thereto, though sometimes made large to fill different diameters of shafts, as hereinafter referred to. At the top of the bore is the longitudinal slot or depression $i$, to receive the lugs $k'\ k^2$ on the shafts, the rear of said slot $i$ being flared, as at $i'$, to direct said lugs into the slot as the sleeve is slipped over the shaft. The forward end of the lug $k'$ may also be brought to a point for the same purpose. Sliding in suitable guides in the upper part of said sleeve is the key $l$, which engages with the lugs $k'\ k^2$ on the shaft, fitting in a depression or seat, $k$, between them, and thus connecting the sleeve to the shaft. A spring, $l'$, secured in the sleeve in any suitable manner, is connected to the key $l$ and forces it down into the seat, the movement of the key being limited by the head $l^2$ on the key. The face of the forward lug, $k'$, is inclined, the key being raised by this inclined face and forced into the seat $k$ between the lugs as the sleeve passes back over the shaft. When the shaft is not of sufficient diameter to fill the bore of the sleeve, the base of the sleeve is filled up with leather or other filling to raise the lugs up within the slot $i$. This filling is secured in place by the curved metal wearing-plate $m$, as fully shown in Fig. 3, the leather filling $m'$ being laid under the plate and held in place by the bolts or screws $h'$, which pass through the plate and the lower part of the sleeve to secure its two parts $d$ $d'$ together at the base.

I prefer to make the point-strap $b'$, connecting with the saddle, and the billet $b^2$, connecting with the belly-band, of one piece, as is fully shown in Figs. 3 and 4, the strap extending back of the sleeve and through its extension $f$, and being secured within said extension by bolts or rivets $f^3$. The extension $f$ is, in this case, provided with the back plate, $f'$, and both back plate and extension have a lip, $f^2$, along one edge, to hold the plate back from the extension sufficiently to give room for the strap. As the point-strap may vary slightly in width, and it is desirable that the lips $f$ bind thereon, the bolt-holes in the plate are elongated, so that the lips may be brought close together, and the free edge of the plate $f'$ is thinned, as at $f^4$, that it may be easily filed off. I also prefer to form the trace-strap $e$ and the stay-strap $c'$ of one piece, this strap extending back of the sleeve across the combined point-strap and billet, and being secured thereto by screws $p'$, passing through metal loops $p$, as fully shown in Fig. 4 and in dotted lines, Fig. 3. These straps may be concealed and protected by a pad, $q$, and, if desired, the entire sleeve may be covered with leather to add to its finish, the key $l$ extending up through the leather. The sleeve D may also be hung from the saddle in substantially the same manner as the ordinary shaft-tug, the brace-strap and stay-strap being finally secured to it.

The apparatus for unhitching or freeing the horse consists, essentially, of any suitable means for raising the key $l$ from its seat between the lugs $k'$ $k^2$, and the means preferred by me is illustrated in the drawings. The plate $k^3$, carrying the lugs $k'$ $k^2$, is attached to the shaft $n$ by means of screws. A small pin, $r$, is secured within the shaft in such position as to be raised through the plate $k^3$, and so lift the key out of the seat $k$. This pin $r$ may be raised by wedge or lever mechanism; but I prefer a wedge, and have illustrated it in the drawings, a longitudinal groove or mortise being formed in the lower part of the shaft, and the guide-plate $s$ being secured to the under part of the shaft, covering this groove or mortise, and having guide-ribs $s'$, which fit up into said mortise and form guides for the wedge $t$, which is connected to the wire $t'$, by which it is drawn backward and forward in the mortise between the guide-ribs. The pin $r$ extends through a hole in the shaft down into the mortise, and its head rests on the wedge $t$, so that the pin is raised or lowered by this wedge. The wire $t'$ extends back to the connecting-bar of the shafts, and is there connected to the arm $u'$ of the rod $u$, supported in loops on said connecting-bar, the unhitching apparatus on both shafts being connected to this rod $u$, and thus operated together. The rod $u$ has an arm, $u^2$, which connects by a loop with the strap $w$, this strap extending up into the wagon or other vehicle, where it can be operated by the driver. A spring, $v$, is secured either to the rod $u$, to its arms $u'$ $u^2$, or to some other part of the apparatus, this spring always holding the wedges $t$ forward, so that the pins $r$ fit within the shafts, having the seats $k$ free for the entrance of the keys $l$.

In hitching horses by my improved apparatus, the horse is harnessed as above described, the sleeve being supported thereon, and the traces and holdback-straps connecting the harness and breechings thereto. The horse is then backed within the shafts, the shaft passing through the sleeves until the keys $l$ engage with the seats $k$ thereon, when the horse is hitched ready for driving. In pulling the vehicle, the draft-strain from the harness or breast-strap is carried by the traces $e'$ through the trace-straps $e$ to the sleeves D, and through the keys $l$ to the lugs $k'$ on the shafts, and in backing the strain from the breechings is carried through the holding-back straps $c^3$, stay-straps $c'$, sleeves D, and keys $l$ to the lugs $k^2$ on the shafts, the strain thus passing either in pulling or backing through the sleeves D to the shafts. In unhitching, all that is necessary is to draw on the strap $w$, raising the keys $l$ out of the seats $k$, when the horse is free; and in case the horse runs off he can be detached in this simple manner, it being generally preferable to support the shafts, so that in such cases they will not fall to the ground. If the driver is standing beside the horse, he can catch the keys $l$ where they extend through the top of the sleeves, and raise them, thus detaching the horse.

If desired, the seat $k$, for the reception of the key $l$, may extend down into the shaft and the bore of the sleeve be cylindrical, the lugs $k'$ $k^2$ and the groove $i$ being dispensed with; but I prefer the construction shown.

What I claim as my invention, and desire to secure by Letters Patent, is—

1. The combination of the shaft $n$, having the seat $k$, with the sleeve D, supported by the harness, and having the spring-key $l$, substantially as set forth.

2. In combination with the shaft, a sleeve supported on the harness and fitting around said shaft, connecting apparatus between said sleeve and shaft, and mechanism within the shaft for disengaging said apparatus, substantially as set forth.

3. The combination of the sleeve having a spring-key, shaft having a corresponding seat, and mechanism for freeing said key from said seat, substantially as set forth.

4. The combination of the sleeve D, having the slot $i$ and spring-key $l$, of the shaft $n$, having the lugs $k'$ $k^2$ and seat $k$ between them, substantially as and for the purposes set forth.

5. The combination of the sleeve D, having the extension $f$, the combined point-strap and billet, the back plate, $f'$, and securing-bolts, substantially as and for the purposes set forth.

6. The combination of the sleeve D, having the extension $f$, the combined point-strap and billet, the back plate, $f'$, and bolts, where said extension and back plate have the lips $f^2$ and the edge of said plates thinned, as at $f^4$, substantially as and for the purposes set forth.

7. The combination, with the sleeve D, of the combined trace-strap and stay-strap, and means for securing it firmly to the sleeve, substantially as and for the purposes set forth.

8. In combination with the sleeve D, having the key $l$, and shaft $n$, having the seat $k$, the pin $r$ and wedge $p$, supported within the shaft, substantially as and for the purposes set forth.

9. In combination with the shaft $n$, the guide-plate $s$, having the ribs $s'$, wedge $t$, and pin $r$, substantially as and for the purposes set forth.

10. In combination with the shaft having the pins $r$ and wedges $t$ therein, the wires $t'$, rod $u$, and spring mechanism for operating said wedges, substantially as and for the purposes set forth.

In testimony whereof I, the said JAMES McC. PORTER, have hereunto set my hand.

JAMES McC. PORTER.

Witnesses:
   JAMES I. KAY,
   J. N. COOKE.